(12) United States Patent
Nakagawa et al.

(10) Patent No.: US 8,365,779 B2
(45) Date of Patent: Feb. 5, 2013

(54) LIQUID QUANTITY MEASURING APPARATUS, LIQUID QUANTITY MEASURING METHOD AND METHOD FOR SUPPLYING QUANTITIVELY SUPPLYING LIQUID MATERIAL

(75) Inventors: Toshiyuki Nakagawa, Kobe (JP); Masaaki Muro, Itami (JP); Tetsuro Shigeno, Itami (JP); Naoyuki Nakamoto, Himeji (JP)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 1088 days.

(21) Appl. No.: 12/095,871

(22) PCT Filed: Nov. 30, 2006

(86) PCT No.: PCT/EP2006/069158
§ 371 (c)(1),
(2), (4) Date: Oct. 21, 2008

(87) PCT Pub. No.: WO2007/063112
PCT Pub. Date: Jun. 7, 2007

(65) Prior Publication Data
US 2009/0308484 A1    Dec. 17, 2009

(30) Foreign Application Priority Data

Dec. 2, 2005   (JP) ................. 2005-349618

(51) Int. Cl.
*B65B 31/00*   (2006.01)
(52) U.S. Cl. .............. 141/39; 141/1; 141/83; 141/95; 141/192
(58) Field of Classification Search .............. 141/1, 39, 141/83, 94, 95, 192; 210/90, 97
See application file for complete search history.

(56) References Cited

U.S. PATENT DOCUMENTS

2002/0043488 A1 *  4/2002  Letessier et al. ............. 210/90

FOREIGN PATENT DOCUMENTS

| DE | 39 29 506 | 3/1991 |
| EP | 1 197 823 | 4/2002 |
| WO | WO 02 088692 | 11/2002 |

OTHER PUBLICATIONS

International Search Report for PCT/EP2006/069158.

(Continued)

*Primary Examiner* — Gregory Huson
*Assistant Examiner* — Jason K Niesz
(74) *Attorney, Agent, or Firm* — Patricia E. McQueeney (57) ABSTRACT

The present invention is aimed at providing a method for simply measuring the liquid quantity of liquid material in a receptacle. A liquid quantity measuring apparatus for use in a liquid material supplying system comprising a receptacle for storing liquid material, a first pipe for feeding feeder gas into said receptacle, a first shutoff valve provided in said first pipe, a second shutoff valve provided in said first pipe downstream of said first shutoff valve and a second pipe for supplying the liquid material from said receptacle to supplier's destinations, and for measuring the liquid quantity of the liquid material in said receptacle, the measuring apparatus comprising: —a first pressure detection means for detecting the pressure of feeder gas in said pipe between said first shutoff valve and said second shutoff valve; —a second pressure detection means for detecting the pressure of gas in said receptacle; and —an arithmetic processing means for seeking by arithmetic calculation the liquid quantity of the liquid material in said receptacle on the basis of the detection results of said first pressure detection means and said second pressure detection means.

20 Claims, 4 Drawing Sheets

OTHER PUBLICATIONS

Patent Abstracts of Japan, publ. No. 2003/149034, published on Mar. 21, 2003, application No. 2001/347824, filed on Nov. 13, 2001.

Patent Abstracts of Japan, publ. No. 2004/271455, published on Sep. 30, 2004, application No. 2003/065437, filed on Mar. 11, 2003.

* cited by examiner

LIQUID QUANTITY MEASURING APPARATUS, LIQUID QUANTITY MEASURING METHOD AND METHOD FOR SUPPLYING QUANTITIVELY SUPPLYING LIQUID MATERIAL

This application is a 371 of International PCT Application PCT/EP2006/069158, filed Nov. 30, 2006.

The present invention relates to an apparatus and method for measuring the liquid quantity in a receptacle, in which a liquid material or especially a liquid material for use in semiconductor manufacture or the like is stored, and besides to a method for quantitatively supplying that liquid material.

In manufacture of semiconductor-integrated devices or micro electronics devices such as liquid crystals and optical elements, there are used in cases materials such as $(CH_3C_5H_4)_3Er$, $Er(C_{11}H_{19}O_2)_3$, $ErCl_3/C_2H_5OH$, $POCl_3$, $TiCl_4$, $Si(OC_2H_5)_4$, (TEOS), $Ta(OC_2H^5)_5$, (PET), $TMA:Al(CH_3)_3$, $TEA:Al(C_2H_5)_3$, $TEMAH:Hf[(N(CH_3)(C_2H_5)]_4$, $TDMAH:Hf[N(CH_3)_2]_4$ and $TDMAS:Si[N(C_2H_5)_2]4$. These liquid materials are stored in a suitable, chemically resistant receptacle and they will be supplied to determined user's premises by feeding feeder gas into this receptacle.

In order to prevent the supply of liquid materials to user's premises from being intercepted, it is necessary to always monitor and control the liquid quantity in a receptacle. Since these materials are special materials that are combustible, poisonous and relatively expensive, it is also necessary to take great care in their handling. Also from this point of view, it is therefore important to measure the liquid quantity in a receptacle.

As means for measuring the liquid quantity in a receptacle, there have been hitherto known means of measuring the liquid quantity by a float-type sensor disposed in a receptacle, such as disclosed in Japanese Patent Application Laid-open No. 149,034/2003, means of measuring the liquid quantity by use of a gravimeter composed of a load cell or the like and means of detecting the liquid level from the outside through a glass window provided on the side wall of a receptacle by an optical fiber-type sensor. In a case where feeder gas is introduced to supply liquid material in a receptacle to user's premises, furthermore, there has been conceived a means of measuring the introduction quantity or discharge quantity of feeder gas by an integrating flowmeter and seeking the remaining quantity of liquid material in a receptacle because the introduction quantity of feeder gas corresponds to the supply quantity of liquid material to supplier's destinations.

However, there are problems in all of these measuring methods.

Float-type sensor is in direct contact with liquid in a receptacle and hence it may contaminate the liquid. In a case where such a float-type sensor is used in a stationary receptacle such as a recharge tank, from which liquid is not delivered usually, as described in Patent Document 1, it is difficult, when the sensor itself has broken, to perform the exchanging work thereof. In addition, the lower limit for measurement of a float-type sensor becomes higher and hence the liquid quantity may get unmeasurable when a small quantity of liquid material remains in a receptacle.

In a case where a gravimeter is used, on the other hand, there is such a problem that the measuring accuracy is lower because various pipes are connected in a receptacle.

For the means of detecting the liquid level through a glass window provided on the side wall of a receptacle by an optical fiber-type sensor, there is such a possibility that the liquid level cannot be accurately detected in a case of liquid material that is opaque and has higher viscosity.

In a case where the liquid quantity of liquid material is calculated by the introduction quantity or discharge quantity of feeder gas, an integrating flowmeter must renew the remaining quantity each time and memorize that value. When this value has got unknown in case of an emergency, however, it will become difficult to measure the liquid quantity.

In order to solve the aforementioned problems, for example, in a method according to Japanese Patent Application Laid-open No. 271,455/2004, it is devised to obtain the liquid quantity of liquid material in a receptacle by detecting the pressure of gas in the receptacle and the quantity of gas discharged from the receptacle and performing calculation on the basis of detection values.

The aforementioned problems are solved by the method disclosed in Patent Documents 2. In a case where the pressure of gas and the gas quantity are measured, however, it is necessary to let a liquid material supplying system to stop its liquid feed before the measurement is performed. Therefore, it is difficult to perform the measurement while the liquid material is supplied.

It is therefore an object of the present to solve problems in such prior arts as mentioned above and to provide an apparatus and method capable of measuring the liquid quantity simply as a liquid material is supplied.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

According to another aspect of the present invention, it is aimed at providing a method for quantitatively supplying a liquid material to supplier's destinations by measuring the liquid quantity thereof.

In order to achieve the aforementioned purposes, a liquid quantity measuring apparatus according to the present invention is for use in a liquid material supplying system comprising a receptacle for storing liquid material, a first pipe for feeding feeder gas into said receptacle, a first shutoff valve provided in said first pipe, a second shutoff valve provided in said first pipe downstream of said first shutoff valve and a second pipe for supplying the liquid material from said receptacle to supplier's destinations, the measuring apparatus being characterized by comprising; a first pressure detection means for detecting the pressure of feeder gas in said pipe between said first shutoff valve and said second shutoff valve; a second pressure detection means for detecting the pressure of gas in said receptacle; and an arithmetic processing means for seeking by arithmetic calculation the liquid quantity of the liquid material in said receptacle on the basis of the detection results of said first pressure detection means and said second pressure detection means, in which said arithmetic processing means seeks by arithmetic calculation the liquid quantity of the liquid material in said receptacle on the basis of:

$$V = V1 - V2 \times (PA1 - PA2)/(PB2 - PB1)$$

wherein V: liquid quantity of liquid material in said receptacle,

V1: volume of said receptacle,

V2: volume of said pipe between said first shutoff valve and said second shutoff valve, PA1: pressure of feeder gas in said pipe between said first shutoff valve and said second shutoff valve before it is fed into said receptacle, PA2: pressure of feeder gas in said pipe between said first shutoff valve and said second shutoff valve after it has been fed into said receptacle, PB1: pressure of feeder gas in said receptacle before the feeder gas is charged in said receptacle and PB2: pressure of feeder gas in said receptacle after the feeder gas has been charged in said receptacle.

A liquid quantity measuring method according to the present invention is applicable to the same liquid material supplying system as mentioned above, the measuring method being characterized by comprising: a first step of shutting said first shutoff valve and said second shutoff valve; a second step of detecting the pressure of feeder gas in said pipe between said first shutoff valve and said second shutoff valve after the first step; a third step of detecting the pressure of gas in said receptacle after the first step; a fourth step of opening said second shutoff valve after the second step and the third step; a fifth step of detecting the pressure of feeder gas in said pipe between said first shutoff valve and said second shutoff valve after the fourth step; a sixth step of detecting the pressure of gas in said receptacle after the fourth step; and a seventh step of seeking by arithmetic calculation the liquid quantity of liquid material in said receptacle from the pressures detected in the second step, third step, fifth step and sixth step on the basis of:

$$V = V1 - V2 \times (PA1 - PA2)/(PB2 - PB1)$$

wherein V: liquid quantity of liquid material in said receptacle,

V1: volume of said receptacle,

V2: volume of said pipe between said first shutoff valve and said second shutoff valve, A1: pressure detected in the second step, PA2: pressure detected in the fifth step, PB1: pressure detected in the third step and PB2: pressure detected in the sixth step.

According to such liquid quantity measuring apparatus and method, the liquid quantity of liquid material in a receptacle can be measured by monitoring the pressure of feeder gas.

While a vary small quantity of liquid material is supplied through said second pipe to supplier's destinations, in addition, the above equation is satisfied and it is enabled to measure the liquid quantity even in its supply because the change of the liquid quantity in the receptacle is very small.

Furthermore, a method according to the present invention for quantitatively supplying liquid material is applicable to the aforementioned liquid material supplying system, the supplying method being characterized by comprising: a first step of shutting said first shutoff valve and said second shutoff valve; a second step of detecting the pressure of feeder gas in said pipe between said first shutoff valve and said second shutoff valve after the first step; a third step of detecting the pressure of gas in said receptacle after the first step; a fourth step of opening said second shutoff valve after the second step and the third step; a fifth step of detecting the pressure of feeder gas in said pipe between said first shutoff valve and said second shutoff valve after the fourth step; a sixth step of detecting the pressure of gas in said receptacle after the fourth step; a seventh step of seeking by arithmetic calculation the liquid quantity of liquid material in said receptacle from the pressures detected in the second step, third step, fifth step and sixth step on the basis of:

$$V3 = V2 \times (PA1 - PA2)/(PB2 - PB1)$$

wherein V3: volume of pressure gas in said receptacle,

V2: volume of said pipe between said first shutoff valve and said second shutoff valve, PA1: pressure detected in the second step, PA2: pressure detected in the fifth step, PB1: pressure detected in the third step and PB2: pressure detected in the sixth step; a eighth step of starting the supply of liquid material to the supplier's destinations; a ninth step of detecting the dropping quantity of the pressure of feeder gas in said receptacle accompanied with the supply of liquid material; and a tenth step of stopping the supply of liquid material to the supplier's destinations when the dropping quantity of the pressure detected in the ninth step has become PC that is sought on the basis of:

$$PC = PB2 - PB2 \times V3/(V3 + VA)$$

wherein PC: dropping quantity of the pressure detected in the ninth step and

VA: predetermined supply quantity of liquid material.

Even in this method, the quantitative supply of liquid material can be accurately performed only by monitoring the pressure of feeder gas.

According to the present invention, as mentioned above, the liquid quantity of liquid material remaining in a receptacle can be measured even in any supplying state, for example during supply, only by monitoring the pressure, and hence the refilling of liquid material or exchange of the receptacle can be carried out with good timing so that the working efficiency can be improved.

According to the present invention, there is no need of using a gravimeter, float-type sensor or optical fiber and such problems as mentioned above do not arise at all.

In the liquid quantity measuring method of the present invention, furthermore, it is not always necessary to memorize the detection values of pressure and hence the liquid quantity does not get unmeasurable even when memorized data have disappeared as in an integrating flowmeter.

According to the method of the present invention, moreover, it is enabled to quantitatively supply liquid material from its storage receptacle to supplier's destinations.

Now referring to the drawings, preferred embodiments of the present invention will be described below.

Figure 1:
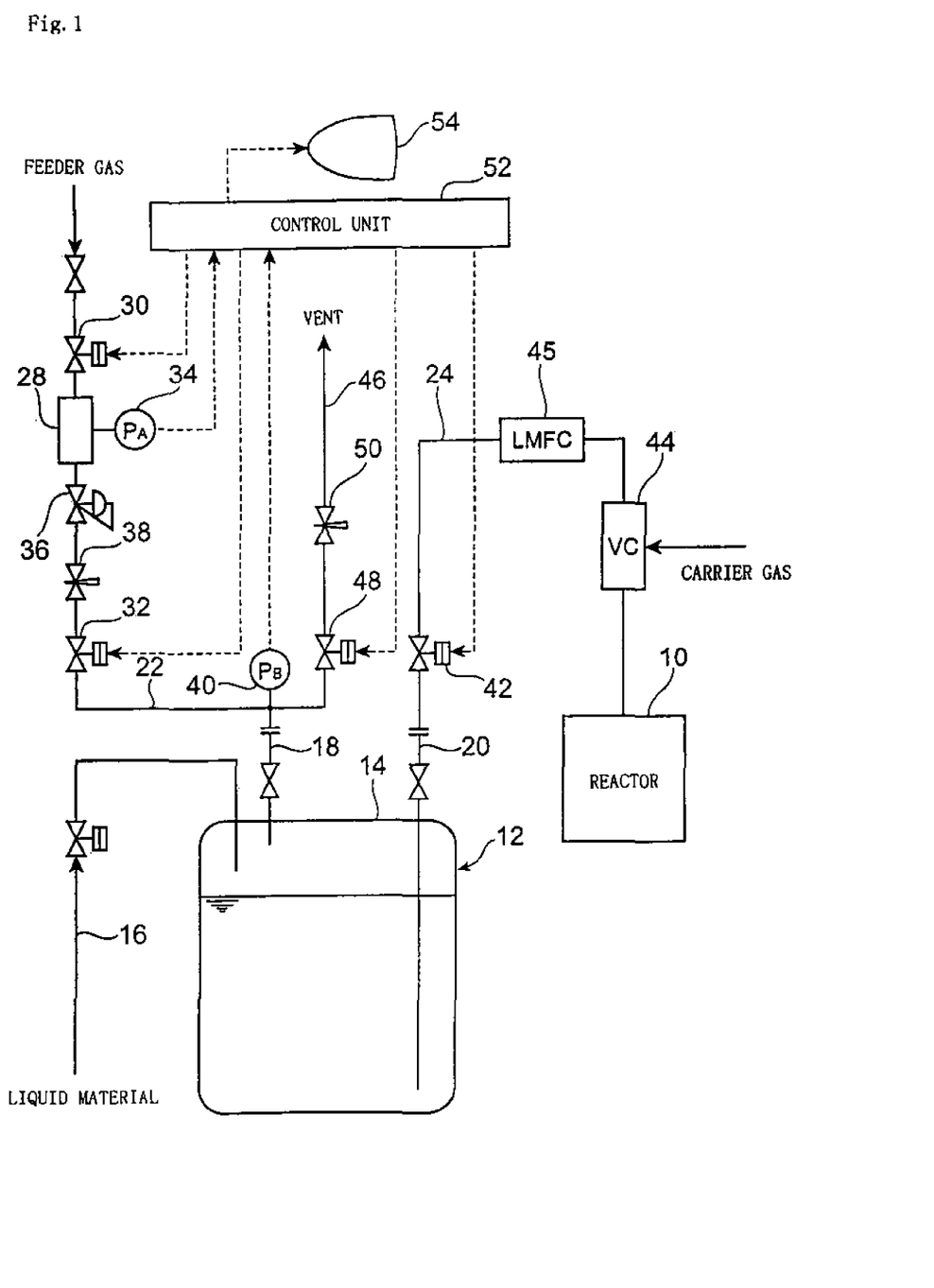
FIG. 1 is a schematic view showing the disclosed liquid material supplying system.

FIG. 1 is a schematic view showing a liquid material supplying system, in which the liquid quantity measuring apparatus according to the present invention is applied. The illustrated liquid material supplying system is, in this embodiment, a system for continuously supplying liquid material such as TMA or TEMAH to a reactor 10 for semiconductor manufacture that is exemplified as supplier's destinations.

This liquid material supplying system comprises a receptacle 12 for storing liquid material. The receptacle 12 is a cylindrical closed container made of a material that is excellent in chemical resistance against liquid material to be stored. In a roof portion 14 of the receptacle 12, three pipes 16, 18, 20 are disposed so as to run through there. The pipe 16 is for refilling the receptacle 12 with liquid material. To the pipe (first pipe) 18 is connected a pipe (first pipe) 22 extending from a supply source (not shown) of feeder gas. End part of the pipe 18 disposed in the receptacle 12 is positioned in an upper space of the receptacle 12 even when the liquid material is in the highest liquid level. And the same end part terminates at the vicinity of the roof portion 14 so as to be not immersed in the liquid material. One end of the pipe (second pipe) 20 is connected to a pipe (second pipe) 24 for transporting the liquid material to the reactor 10 and the other end thereof is disposed in the vicinity of the bottom of the receptacle 12.

In the pipe 22 is provided a buffer tank 28 for feeding feeder gas within a constant pressure range. Also in the pipe 22 are provided a shutoff valve (first shutoff valve) 30 upstream of the buffer tank 28 and a shutoff valve (second shutoff valve) 32 downstream thereof respectively along the flowing direction of feeder gas. Introduction pressure of feeder gas fed into the receptacle 12 can be regulated by regulating the opening and shutting operation of these shutoff valves 30, 32. Between the shutoff valves 30, 32, a pressure sensor (first pressure detection means) 34 is provided for detecting the pressure of feeder gas in the pipe 22. In this embodiment, the pressure sensor 34 is fixed so as to detect the pressure in the buffer tank 28, in which the state of feeder gas is stabilized. In the pipe 22, furthermore, a pressure reduction valve 36 and a needle valve 38 are provided between the buffer tank 28 and shutoff valve 32 so that excessive pressure and flow rate do not occur. In addition, it is designed that the volume of the pipe 22 between the shutoff valves 30, 32 (inclusive of the volume of the buffer tank 28) gets sufficiently larger as compared with the volume of the pipe 22 between the pressure reduction valve 36 and shutoff valve (or that the volume of the pipe 22 between the pressure reduction valve 36 and shutoff valve gets very small). In a portion of this pipe 22 on the lowermost downstream side is fixed a pressure sensor (second pressure detection means) 40 for detecting the pressure of feeder gas charged in the receptacle 12. As to this pressure sensor 40, it may be directly fixed on the receptacle 12.

In the pipe 24 connected to the reactor 10 is fixed a shutoff valve 42. It is planned that the flow rate of liquid material fed into the reactor 10 can be regulated by regulating the opening and shutting operation of this shutoff valve 42. In this embodiment, a vaporizing chamber 44 is provided in the pipe 24, where the liquid material will be introduced into the reactor 10 after it is vaporized in the same vaporizing chamber 44 by carrier gas. In addition, the reference numeral 45 represents a mass flow controller.

In addition, a pipe 46 is a vent line for releasing the pressure of an upper space in the receptacle 12. In this pipe 46 are disposed a shutoff valve 48 and needle valve 50 for adjusting the pressure of the upper space in the receptacle 12.

The shutoff valves 30, 42, 32, 48 are controlled by a control unit (arithmetic processing means) 52. After this control unit 52 has received detection signals of the pressure sensors 34, 40, it calculates the liquid quantity of liquid material in the receptacle 12 through such a method as mentioned below and has a proper display means 54 displaying the detection results thereof.

If feeder gas is fed to the upper space of the receptacle 12 through the pipes 22, 18, in such a construction as mentioned above, the pressure in the receptacle 12 rises. The liquid material in the receptacle 12 is therefore fed to the pipes 20, 24 and vaporized by the vaporizing chamber 44. Then, the vaporized liquid material will be introduced into the reactor 10.

In order to accurately gauge the quantity of liquid material to be introduced into the reactor 10 by the mass flow controller 45, the control unit 52 must control the open degree of the shutoff valves 30, 32 to regulate the supply pressure on the side of the receptacle 12. That method will be described below referring to FIG. 2.

Figure 2:
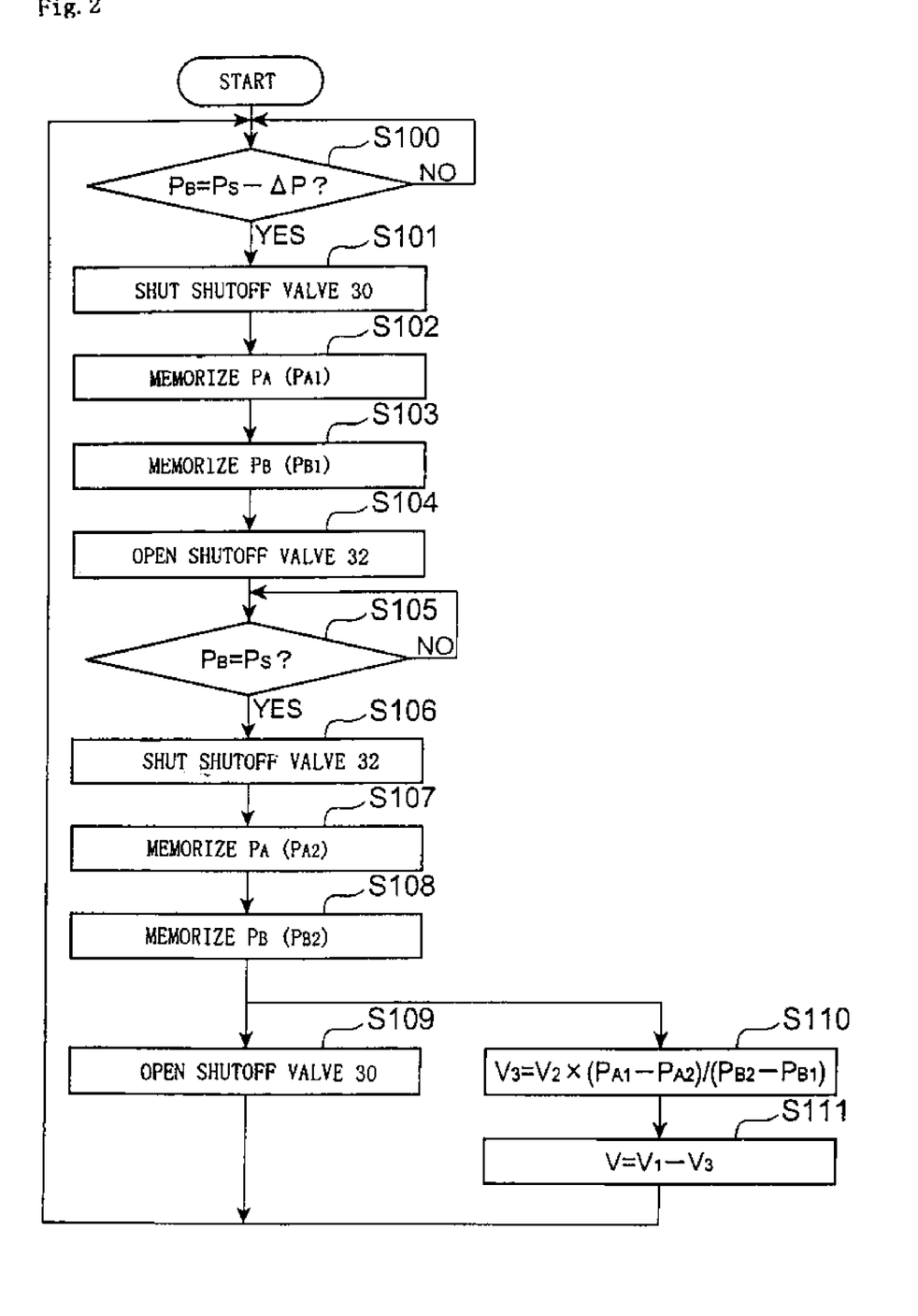
FIG. 2 is a flow chart illustrating the method used with the system of FIG. 1.

At first, the shutoff valves 30, 32 are previously made opened, the shutoff valve 42 is made shut and the pressure PB in the receptacle 12 is set at a predetermined supply pressure PS. If the pressure PB has become PS, the shutoff valve 32 is shut so that the pressure in the buffer tank 28 is made to be a predetermined pressure that is higher than the supply pressure PS. When the shutoff valve 42 is made opened under this state, liquid material in the receptacle 12 is supplied to the reactor 10 through the pipes 20, 24. The control unit 52 reads off signals of the pressure sensor 40 to detect the pressure PB in the receptacle 12. When the supply of liquid material is started, the pressure PB in the receptacle 12 will be gradually reduced. If the pressure PB has been reduced only by a predetermined control range ΔP for the supply pressure, the control unit 52 shuts the shutoff valve 30 and opens the shutoff valve 32 to raise the pressure PB in the receptacle 12 so that it is returned to the predetermined supply pressure PS (the steps 100, 101 and 104). If the control unit 52 has judged that the pressure PB in the receptacle 12 has been returned to the supply pressure PS, it shuts the shutoff valve 32 (the steps 105 and 106). Then, the shutoff valve 30 is opened so as to return the pressure PA in the buffer tank 28 to the predetermined pressure (the step 109). By repeating these steps, the liquid material will be supplied to supplier's destinations substantially at a constant flow rate.

Now, attention should be taken to a fact that the supply quantity of liquid material is very small in semiconductor manufacture. Even if 60 g/min, this is larger than the maximum supply quantity that can be actually supposed, is set as a supply quantity, for example, in a case of liquid material, whose specific gravity is 1, it will be concluded that the liquid material is merely consumed from the receptacle 12 at a flow rate as small as 60 cc/min (1 cc/s). In addition, the volume V1 of the receptacle 12 is set to be enough larger as compared with this consumption quantity. Even under such a condition as mentioned above, the liquid quantity measuring method in this embodiment can be effectively performed. Next, the liquid quantity measuring method will be described.

If the control unit 52 has judged that the pressure PB in the receptacle 12 has become (Ps−ΔP) in the step 100 of FIG. 2, as mentioned above, it shuts the shutoff valve 30 (the step 101) and thereafter memorizes the detected pressure value PA1 from the pressure sensor 34 and the detected pressure value PB1 t from the pressure sensor 40 in the step 102 and step 103. In succession, the shutoff valve 32 is opened to feed the feeder gas into the receptacle 12, and when the pressure PB in the receptacle 12 has become Ps, the shutoff valve 32 is shut (steps 104, 105, 106). Then, the control unit 52 memorizes the detected pressure value PA2 from the pressure sensor 34 and the detected pressure value PB2 from the pressure sensor 40 in the step 107 and step 108.

Now, the control unit 52 transfers to the step 110 and it calculates from the memorized pressure values PA1, PB2, PA2 and PB2 the volume V3 of feeder gas charged in the receptacle 12 (this is the volume of an upper space of the receptacle 12) on the basis of:

$$V3 = V2 \times (PA1 - PA2)/(PB2 - PB1) \quad (1)$$

In addition, V2 is the volume of feeder gas existing between the shutoff valve 30 and shutoff valve 32. This equation utilizes such a law of conservation of mass that the mass of feeder gas charged in the receptacle 12 is equal to the mass of feeder gas that has moved from an area between the shutoff valve 30 and shutoff valve 32. Since the consumption quantity of liquid material is very small as mentioned above, it is conceived that the liquid quantity of liquid material scarcely varies for the pressure charging time (about 1~2 seconds)

within the control range ΔP for the supply pressure. Therefore, the application of this law of conservation of mass is possible and this is based on the findings of the inventors of the present application. Of course, the above equation is not sometimes satisfied in a case where the consumption quantity of liquid material is large. If the consumption quantity (unit: cc/min) of liquid material is less than 1% for the volume (unit: cc) of the receptacle 12, however, the pressure error will be 1% and this can be ignored as measurement error. Since liquid material is non-compressive and it's charging time is very short, furthermore, it is conditioned that the dissolution of compressive gas in liquid material can be ignored. Although temperature is not taken into consideration in the above equation because the receptacle 12 and pipe 22 are generally disposed in the same space, the above equation may be temperature-reduced when any temperature change is in the surroundings of the receptacle 12 and pipe 22.

Since the thus-sought V3 is corresponding to the volume of the upper space of the receptacle 12, the control unit 52 then calculates the liquid quantity V of liquid material by using the equation V=V1–V3 in the step 111. V1 is the volume of the receptacle 12. This liquid quantity V is preferably displayed by a proper display means 54. In succession, the control unit 52 opens the shutoff valve 30 and returns to the step 100.

In the next place, the measuring method according to the present invention will be described by a concrete example. As to the pressure values, in addition, they shall be red by absolute pressures.

The volume V1 of the receptacle 12 is set at 5.0 L and the volume V2 from the shutoff valve 30 to the shutoff valve 32 is set at 0.3 L. Assuming that the supply pressure PS is 1.5 kg/cm2 and the control range ΔP for the supply pressure is 0.05 kg/cm², the pressure PB1 in the receptacle 12 before the feeder gas is fed thereto becomes 1.45 kg/cm² and the pressure PB2 after the feeder gas has been fed thereto becomes 1.5 kg/cm².

Assuming that the pressure PA1 in the pipe 22 before the feeder gas is fed thereto is 3.0 kg/cm² and the pressure PB2 after the feeder gas has been fed thereto is 2.9 kg/cm², the volume V3 of the feeder gas in the receptacle 12 can be calculated by the above equation (1) as follows.

$$V_3 = V_2 \times (P_{A1} - P_{A2})/(P_{B2} - P_{B1})$$
$$= 0.3 \times (3.0 - 2.9)/(1.50 - 1.45)$$
$$= 0.6 \text{ L}$$

Thus, the liquid quantity V of liquid material in the receptacle 12 is sought as follows.

$$V = V_1 - V_3$$
$$= 5 - 0.6$$
$$= 4.4 \text{ L}$$

In the first embodiment, as has been described above, the liquid quantity in the receptacle 12 can be accurately measured without stopping the liquid feed of the liquid material supplying system. Moreover, there do not arise such disadvantages that a conventional liquid quantity measuring apparatus using a float-type sensor or optical fiber has. Although the lower limit where the liquid quantity is measurable has been higher particularly in a float-type sensor, it is possible, in the liquid quantity measuring method according to this embodiment, to measure the liquid quantity until the liquid material in the receptacle is substantially lost because the pressures are monitored. Since the memory of the detection values from the pressure sensors 34, 40 is always renewed for a short period of time, such a problem does not arise that the liquid quantity gets unmeasurable even when the memorized values have disappeared as in a measuring apparatus using an integrating flowmeter.

Figure 3:
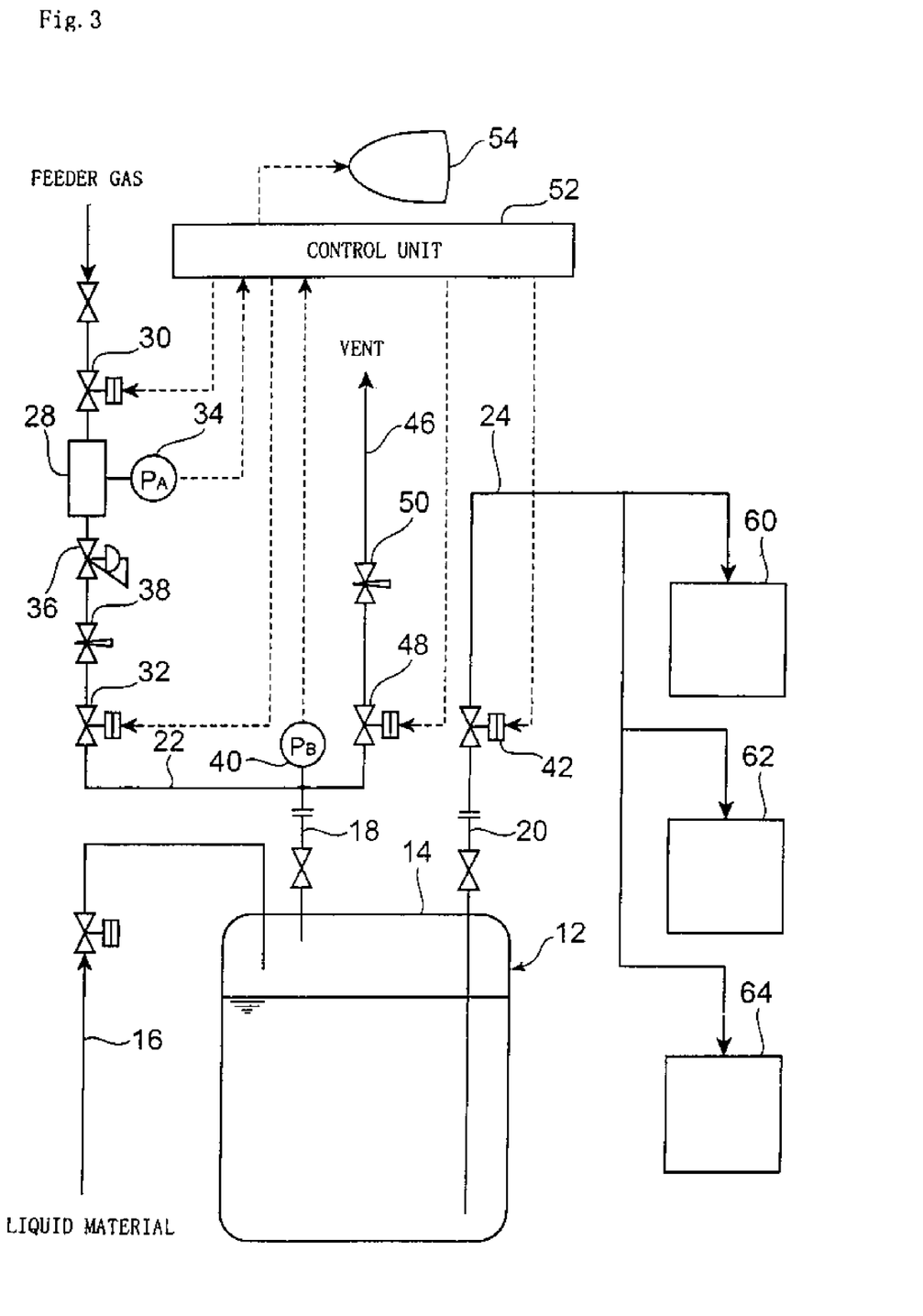
FIG. 3 is a schematic view showing another embodiment of the disclosed liquid supplying system.
Figure 4:
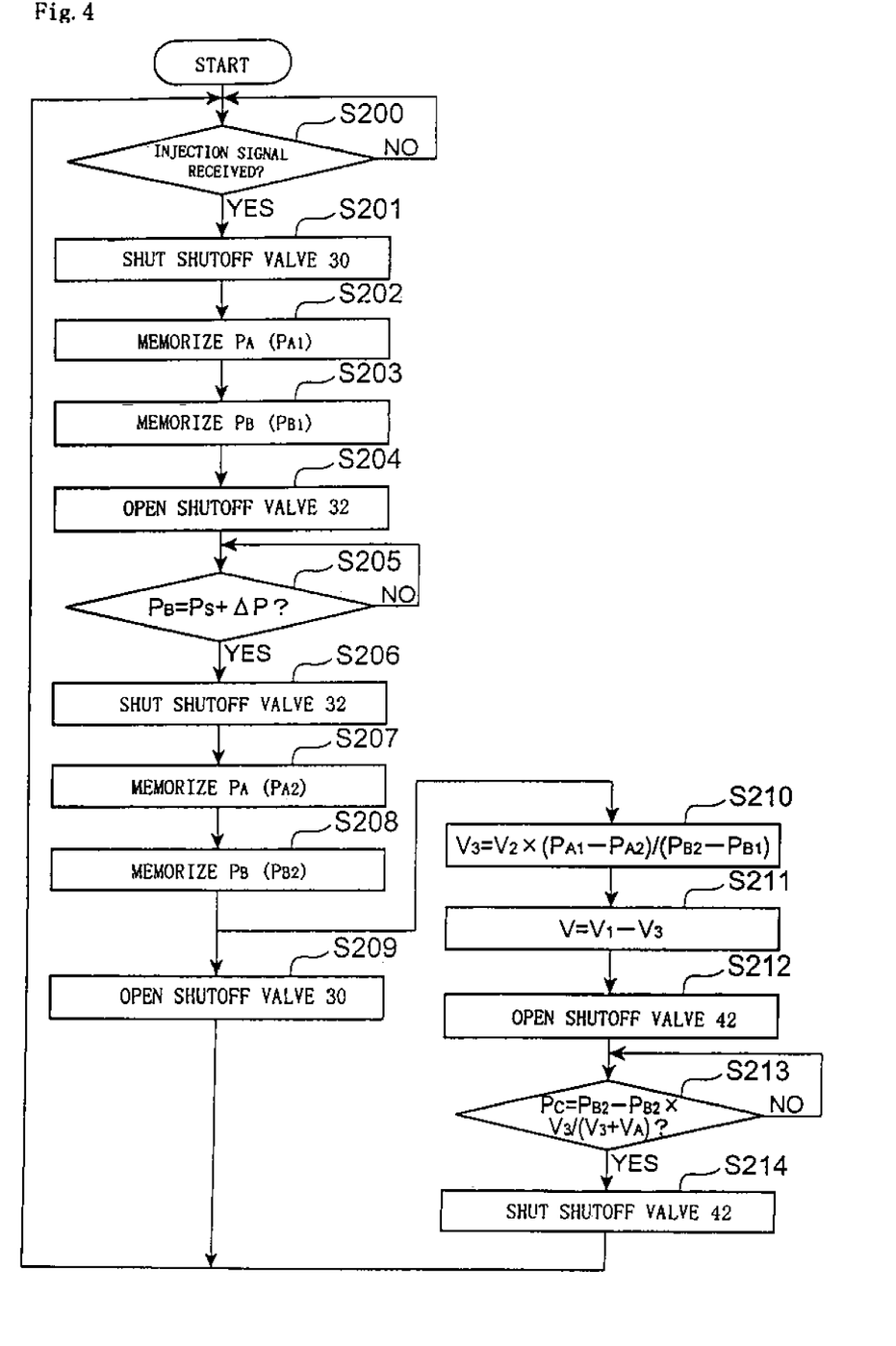
FIG. 4 is a flow chart illustrating the method used with the system of FIG. 3.

Referring to FIG. 3 and FIG. 4, the second embodiment of the present invention will be described below. In addition, the same or corresponding portions as those in the first embodiment are given the same numerals and duplicate descriptions thereof will be omitted.

In the second embodiment, as shown in FIG. 3, only the supplier's destinations are different from those of the first embodiment and it is planned that liquid material is transferred to other receptacles 60, 62, 64 such as a recharge tank, bubbling tank and vaporizing tank to refill the liquid quantity of these other receptacles. Differently from the first embodiment, in this case, liquid material is fed from a receptacle 12 to supplier's destinations only in need (in the refilling time). When liquid material in an amount of 0.6 L is transferred for 60 seconds, for example, the liquid material will be consumed at a flow rate of 10 cc/s. In the second embodiment, therefore, there is such a possibility that the liquid quantity to be detected varies while the pressure charge is performed because the supply quantity is relatively larger and it is impossible to measure the liquid quantity the liquid material is supplied as in the first embodiment. By utilizing in the second embodiment the facts that the supply of liquid material is not always performed and there is no need of accurately controlling the supply pressure, however, it is possible to perform the measurement of liquid quantity with such timing as mentioned below and thereafter to transfer a necessary supply quantity to the other receptacles 60, 62, 64 of the supplier's destinations. This quantitative supply will be described below.

When the control unit 52 does not receive at first in an initial state a signal requiring the injection of liquid material to the other receptacles 60, 62, 64, the shutoff valve 30 is made opened and the shutoff valves 32, 42 are made shut so that the supply of liquid material is not performed. And, when the control unit 52 receives the liquid material injection signal, it shuts the shutoff valve 30 and opens the shutoff valve 32 to feed feeder gas into the receptacle 12 (the steps 200, 201, 204). After the shutoff valve 30 has been shut, the control unit 52 memorizes the detected pressure value PA1 from the pressure sensor 34 for detecting the pressure in the pipe 22 and the detected pressure value PB1 from the pressure sensor 40 for detecting the pressure PB in the receptacle 12 (the step 202, 203). When the shutoff valve 32 is made opened so that the pressure PB in the receptacle 12 rises only by a predetermined value ΔP and becomes (PS+ΔP) from an initial set pressure Ps, the shutoff valve 32 is shut and the shutoff valve 30 is opened (the steps 205, 206, 209). After the shutoff valve 32 has been shut, the control unit 52 memorizes the detected pressure value PA2 from the pressure sensor 34 and the detected pressure value PB2 from the pressure sensor 40 (the step 207, 208). Then the control unit 52 transfers to the steps 210, 211 and it calculates the liquid quantity V in the receptacle 12. The aforementioned steps are substantially the same as in the first embodiment with the exception of that the timing of the shutoff valves 30, 32 is conducted on the basis of the injection signal.

In this second embodiment, moreover, it is planned that liquid material is quantitatively supplied to the supplier's destinations 60, 62, 64 by utilizing the volume V3 of feeder gas sought in the step 210. If the liquid quantity V in the receptacle 12 has been sought, namely, the shutoff valve 42 is opened in succession to start the supply of liquid material (the step 212). If the liquid quantity to be supplied is represented by VA, the volume V3 of feeder gas in the receptacle 12 will increase and the pressure in the receptacle 12 will drop. If this dropping quantity PC of pressure is expressed by an equation, it will be given by the following equation.

$$PC = PB2 - PB2 \times V3/(V3 + VA) \quad (2)$$

Then the control unit 52 monitors the pressure detection values from the pressure sensor 40 and judges whether the dropping quantity of pressure has reached the pressure PC sought by the equation (2) (the step 213). If the dropping quantity of pressure in the receptacle 12 has not reached PC, it is judged that the liquid quantity supplied to supplier's destinations does not reach the predetermined quantity VA. Thus, the quantitative supply is continued. If the dropping quantity of pressure in the receptacle 12 has reached PC, the control unit 52 shuts the shutoff valve 42 and stops the quantitative supply (the step 214).

In the next place, the liquid quantity measuring method and quantitative supplying method according to the second embodiment will be described using a concrete example. As to the pressure values, in addition, they shall be red by absolute pressures.

The volume V1 of the receptacle 12 is set at 5.0 L and the volume V2 from the shutoff valve 30 to the shutoff valve 32 is set at 0.3 L. Assuming that the supply pressure PS that has been initially set is 1.0 kg/cm2 and the rising value ΔP of pressure caused by the feed of feeder gas is 0.1 kg/cm2, the pressure PB1 before the feeder gas is fed to the receptacle 12 and the pressure PB2 after the feeder gas has been fed therein, each detected by the pressure sensor 40 for detecting the gas pressure in the receptacle 12, become 1.0 kg/cm2 and 1.1 kg/cm2 that is Ps+ΔP, respectively. Assuming that the pressure PA1 before the feeder gas is fed to the pipe 22 and pressure PA2 after the feeder gas has been fed therein, each detected by the pressure sensor 34 for detecting the pressure in the pipe 22, are 3.0 kg/cm2 and 2.9 kg/cm2, furthermore, the volume V3 of the gas layer in the receptacle 12 can be calculated in accordance with the above equation (1) as follows.

$$V_3 = V2 \times (P_{A1} - P_{A2})/(P_{B2} - P_{B1})$$
$$= 0.3 \times (3.0 - 2.9)/(1.1 - 1.0)$$
$$= 0.3 \text{ L}$$

Thus, the liquid quantity V of liquid material in the receptacle 12 is sought as follows.

$$V = V_1 - V_3$$
$$= 5 - 0.3$$
$$= 4.7 \text{ L}$$

Now assuming that the liquid quantity VA to be quantitatively supplied is 0.2 L, the dropping value PC of pressure in the receptacle 12 when liquid material in that amount is supplied to the supplier's destinations can be calculated as follows.

$$P_C = P_{B2} - P_{B2} \times V_3/(V_3 + V_A)$$
$$= 1.1 - 1.1 \times 0.3/(0.3 + 0.2)$$
$$= 0.44 \text{ kg/cm2}.$$

If the supply of liquid material has been performed until the pressure in the receptacle 12 drops from an initial pressure of 1.1 kg/cm² to 1.1−0.44=0.66 kg/cm2, namely, it is judged that the liquid material in an amount of 0.2 L has been injected in the other receptacles 60, 62, 64 of the supplier's destinations.

By monitoring the pressure of feeder gas, as mentioned above, it is enabled to accurately perform not only the measurement of liquid quantity but also the quantitative supply of liquid material.

Although the preferred embodiments of the present invention have been described above in detail, it goes without saying that the present invention is not limited to the aforementioned embodiments. In the aforementioned embodiments, for example, the receptacle 12 is of the rechargeable type, but it may be an exchangeable receptacle. In addition, elements such as valves provided in the pipes are also not limited to those used in the aforementioned embodiments.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus comprising:
    a receptacle for storing liquid material;
    a first pipe for feeding feeder gas into said receptacle;
    a buffer tank coupled to the first pipe;
    a first shutoff valve provided in said first pipe upstream from the buffer tank;
    a pressure reduction valve provided in the first pipe downstream from the buffer tank;
    a first needle valve provided in said first pipe downstream from the pressure reduction valve;
    a second shutoff valve provided in said first pipe downstream from the needle valve;
    a first pressure detection means for detecting the pressure of feeder gas in said pipe between said first shutoff valve and said second shutoff valve, the first pressure detection means coupled to the buffer tank;
    a second pressure detection means for detecting the pressure of gas in said receptacle, the second pressure detection means coupled to said first pipe downstream from the second shutoff valve;
    a valve provided in the first pipe downstream of the second shutoff valve and upstream of the receptacle; and
    an arithmetic processing means for seeking by arithmetic calculation the liquid quantity of the liquid material in said receptacle on the basis of the detection results of said first pressure detection means and said second pressure detection means, in which said arithmetic processing means seeks by arithmetic calculation the liquid quantity of the liquid material in said receptacle on the basis of:

$$V=V1-V2\times(PA1-PA2)/(PB2-PB1)$$

wherein V: liquid quantity of liquid material in said receptacle,
V1: volume of said receptacle,
V2: volume of said pipe between said first shutoff valve and said second shutoff valve
PA1: pressure of feeder gas in said pipe between said first shutoff valve and said second shutoff valve before it is fed into said receptacle,
PA2: pressure of feeder gas in said pipe between said first shutoff valve and said second shutoff valve after it has been fed into said receptacle,
PB1: pressure of feeder gas in said receptacle before the feeder gas is charged in said receptacle and
PB2: pressure of feeder gas in said receptacle after the feeder gas has been charged in said receptacle.

2. A liquid quantity measuring method for use in a liquid material supplying system comprising a receptacle for storing liquid material, a first pipe for feeding feeder gas into said receptacle, a first shutoff valve provided in said first pipe, a second shutoff valve provided in said first pipe downstream of said first shutoff valve and a second pipe for supplying the liquid material from said receptacle to supplier's destinations, and for measuring the liquid quantity of the liquid material in said receptacle, the measuring method comprising:
   a first step of shutting said first shutoff valve and said second shutoff valve;
   a second step of detecting the pressure of feeder gas in said pipe between said first shutoff valve and said second shutoff valve after the first step;
   a third step of detecting the pressure of gas in said receptacle after the first step;
   a fourth step of opening said second shutoff valve after the second step and the third step;
   a fifth step of detecting the pressure of feeder gas in said pipe between said first shutoff valve and said second shutoff valve after the fourth step;
   a sixth step of detecting the pressure of gas in said receptacle after the fourth step; and
   a seventh step of seeking by arithmetic calculation the liquid quantity of liquid material in said receptacle from the pressures detecting in the second step, third step, fifth step and sixth step on the basis of:

$$V=V1-V2\times(PA1-PA2)/(PB2-PB1)$$

wherein V: liquid quantity of liquid material in said receptacle,
V1: volume of said receptacle,
V2: volume of said pipe between said first shutoff valve and said second shutoff valve,
PA1: pressure detected in the second step,
PA2: pressure detected in the fifth step,
PB1: pressure detected in the third step and
PB2: pressure detected in the sixth step.

3. A liquid quantity measuring method according to claim 2, in which the first step to the seventh step are performed while a very small quantity of liquid material is supplied through said second pipe to suppliers destinations.

4. A method for quantitatively supplying liquid material which is for use in a liquid material supplying system comprising a receptacle for storing liquid material, a first pipe for feeding feeder gas into said receptacle, a first shutoff valve provided in said first pipe, a second shutoff valve provided in said first pipe downstream of said first shutoff valve and a second pipe for supplying the liquid material from said receptacle to supplier's destinations, and for supplying the liquid material in said receptacle at a predetermined quantity to supplier's destinations, the supplying method comprising:
   a first step of shutting said first shutoff valve and said second shutoff valve;
   a second step of detecting the pressure of feeder gas in said pipe between said first shutoff valve and said second shutoff valve after the first step;
   a third step of detecting the pressure of gas in said receptacle after the first step;
   a fourth step of opening said second shutoff valve after the second step and the third step;
   a fifth step of detecting the pressure of feeder gas in said pipe between said first shutoff valve and said second shutoff valve after the fourth step;
   a sixth step of detecting the pressure of gas in said receptacle after the fourth step;
   a seventh step of seeking by arithmetic calculation the liquid quantity of liquid material in said receptacle from the pressures detected in the second step, third step, fifth step and sixth step on the basis of:

$$V3=V2\times(PA1-PA2)/(PB2-PB1)$$

wherein V3: volume of pressure gas in said receptacle,
V2: volume of said pipe between said first shutoff valve and said second shutoff valve,
PA1: pressure detected in the second step,
PA2: pressure detected in the fifth step,
PB1: pressure detected in the third step and
PB2: pressure detected in the sixth step;
   an eighth step of starting the supply of liquid material to the supplier's destinations;
   a ninth step of detecting the dropping quantity of the pressure of feeder gas in said receptacle accompanied with the supply of liquid material; and
   a tenth step of stopping the supply of liquid material to the supplier's destinations when the dropping quantity of the pressure detected in the ninth step has become PC that is sought on the basis of:

$$PC=PB2-PB2\times V3/(V3+VA)$$

Wherein PC: dropping quantity of the pressure detected in the ninth step and
VA: predetermined supply quantity of liquid material.

5. The apparatus of claim 1, further comprising a third shutoff valve provided in a second pipe that is coupled to the first pipe.

6. The apparatus of claim 5, further comprising a second needle valve provided in the second pipe downstream from the third shutoff valve.

7. The apparatus of claim 6, further comprising a fourth shutoff valve provided in the second pipe.

8. The apparatus of claim 7, further comprising a mass flow controller provided in the second pipe.

9. The apparatus of claim 8, further comprising a vaporizer provided in the second pipe downstream from the mass flow controller.

10. The method of claim 2, wherein the apparatus further comprises a first needle valve coupled between the first shutoff valve and the second shutoff valve.

11. The method of claim 10, wherein the apparatus further comprises a third shutoff valve provided in a third pipe that is coupled to the first pipe.

12. The method of claim 11, wherein the apparatus further comprises a second needle valve provided in the third pipe downstream from the third shutoff valve.

13. The method of claim 12, wherein the apparatus further comprises a fourth shutoff valve provided in the second pipe.

14. The method of claim 13, wherein the apparatus further comprises a mass flow controller provided in the second pipe.

15. The method of claim 14, wherein the apparatus further comprises a vaporizer provided in the second pipe downstream from the mass flow controller.

16. The method of claim 4, wherein the apparatus further comprises a first needle valve coupled between the first shutoff valve and the second shutoff valve.

17. The method of claim 16, wherein the apparatus further comprises a third shutoff valve provided in a third pipe that is coupled to the first pipe.

18. The method of claim 17, wherein the apparatus further comprises a second needle valve provided in the third pipe downstream from the third shutoff valve.

19. The method of claim 18, wherein the apparatus further comprises a fourth shutoff valve provided in the second pipe.

20. The method of claim 19, wherein the apparatus further comprises:
a mass flow controller provided in the second pipe; and
a vaporizer provided in the second pipe downstream from the mass flow controller.

* * * * *